United States Patent [19]

Riley et al.

[11] Patent Number: 4,598,589
[45] Date of Patent: Jul. 8, 1986

[54] METHOD OF CW DOPPLER IMAGING USING VARIABLY FOCUSED ULTRASONIC TRANSDUCER ARRAY

[75] Inventors: James K. Riley, Shingle Springs; Stockton M. Miller-Jones, Rancho Cordova, both of Calif.

[73] Assignee: General Electric Company, Rancho Cordova, Calif.

[21] Appl. No.: 631,735

[22] Filed: Jul. 17, 1984

[51] Int. Cl.[4] ............................................. G01N 29/00
[52] U.S. Cl. ........................................ 73/609; 73/625; 367/90; 367/105; 128/660; 128/663
[58] Field of Search ......................... 73/625, 626, 609; 367/90, 105; 128/663, 661, 660

[56] References Cited

U.S. PATENT DOCUMENTS

| 3,732,532 | 5/1973 | Flaherty et al. | 367/90 |
| 4,155,258 | 5/1979 | Engeler et al. | 73/626 |
| 4,155,260 | 5/1979 | Engeler et al. | 73/626 |
| 4,217,909 | 8/1980 | Papadofrangakis et al. | 128/663 |
| 4,265,126 | 5/1981 | Papadofrangakis et al. | 128/663 |
| 4,492,120 | 1/1985 | Lewis et al. | 73/628 |
| 4,509,153 | 4/1985 | Weight | 367/103 |

Primary Examiner—Howard A. Birmiel
Attorney, Agent, or Firm—Flehr, Hohbach, Test, Albritton & Herbert

[57] ABSTRACT

Continuous wave (CW) Doppler imaging employs a linear array of transducer elements with a first plurality of elements functioning as an ultrasonic wave transmitter and a second plurality of elements functioning as a receiver of the reflected ultrasonic wave. Time delay circuitry connected to the transmitter and receiver elements define the beam focus and beam steering of the ultrasonic wave.

9 Claims, 4 Drawing Figures

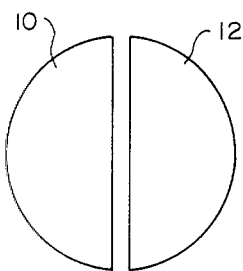
PRIOR ART
FIG. — 1
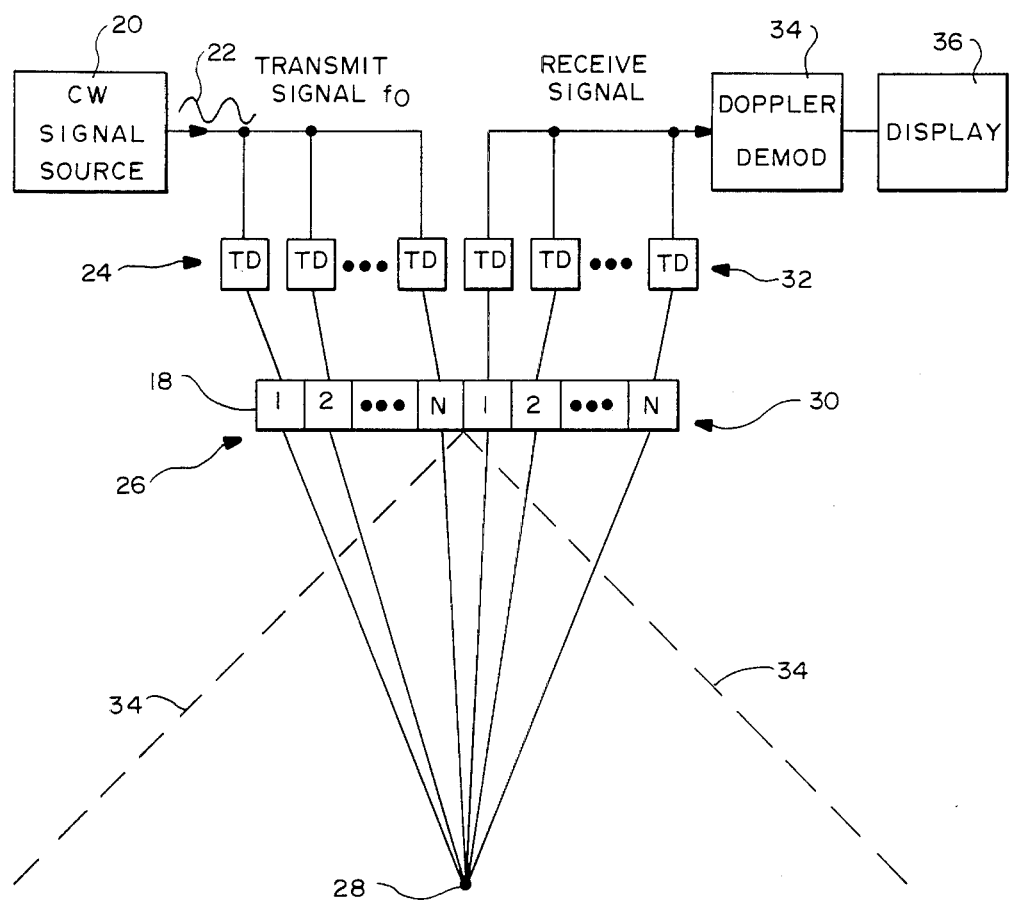
FIG. — 2

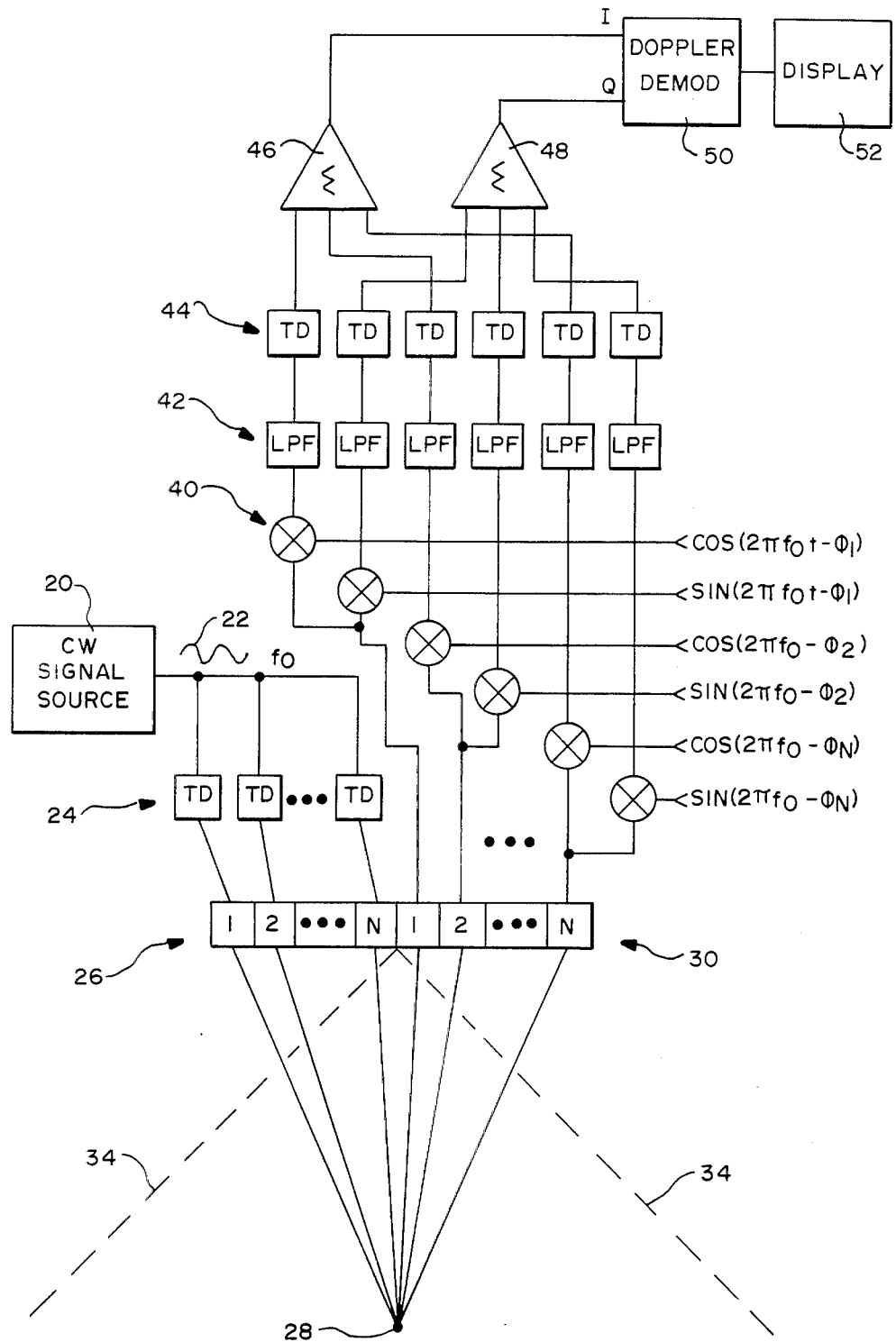
FIG. —3

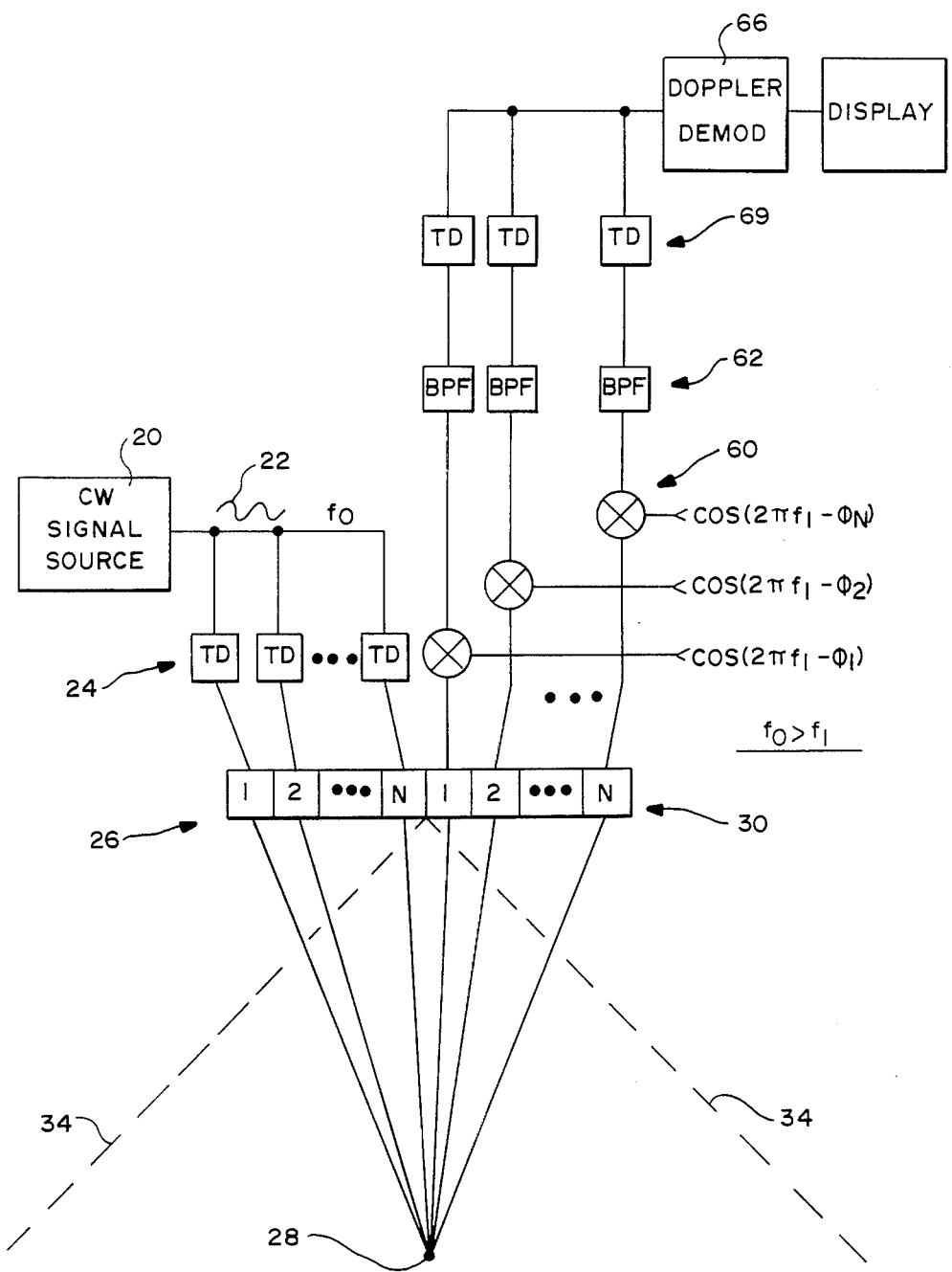
FIG.—4

METHOD OF CW DOPPLER IMAGING USING VARIABLY FOCUSED ULTRASONIC TRANSDUCER ARRAY

This invention relates generally to ultrasonic imaging, and more particularly the invention relates to continuous wave (CW) Doppler imaging using a variably focused transducer array.

A large number of ultrasound imaging systems for medical application utilize arrays of transducers for which the focusing or steering of the acoustic beam or both focusing and steering of the acoustic beam are accomplished through the application of time delays to the transmitted and received electronic signals. Many of these instruments are used in applications requiring extraction of the Doppler frequency shift from the echo signals from specific targets. While much of this Doppler measurement can be accomplished in the pulse echo mode using the entire collection of transducer elements constituting the active aperture of both transmitters and receivers, certain applications require the extended maximum velocity detection capability and improved signal to noise ratio provided by continuous wave (CW) operation.

Heretofore, CW Doppler imaging systems have utilized two element transducers typically arranged as a split disc with one element employed as the ultrasonic wave transmitter and the other element functioning as the reflected wave receiver. Focusing of the transducer element is provided by a lens attached to the transmission and reception surfaces of the elements. A plurality of transducer structures focused at different depths, such as 3 cm, 6 cm, and 10 cm, are necessary for imaging various depths within a patient.

In accordance with the present invention a method of CW Doppler imaging is provided where the focus and angle of the ultrasound beam can be varied without the need for changing transducers. Spatial and velocity resolution can be maintained while the transducer is operated at a lower frequency than conventionally employed.

A multi-element linear transducer array is provided in which a portion of the elements are used as a transmitter and other elements are used as the receiver. In a preferred embodiment elements to one side of the beam central axis are used as transmitters, and elements on the opposite side of the central beam axis are used as receivers. Variable beam steering and focus are realized by the phase delay between elements.

The invention and objects and features thereof will be more readily apparent from the following detailed description and appended claims when taken with the drawing, in which:

FIG. 1 is a plan view of a conventional CW Doppler transducer array.

FIG. 2 is a schematic diagram of a variably focused CW Doppler transducer array and circuitry in accordance with one embodiment of the invention.

FIG. 3 is a schematic diagram of a variably focused CW Doppler transducer array and circuitry in accordance with another embodiment of the invention.

FIG. 4 is a schematic diagram of a variably focused CW Doppler transducer array and circuitry in accordance with another embodiment of the invention.

Referring now to the drawing, FIG. 1 is a plan view of a conventional CW Doppler transducer array. Typically, the array comprises two elements 10 and 12 arranged as a split disc with the element 10 functioning as the CW ultrasonic wave transmitter and element 12 functioning as the receiver of the reflected CW ultrasonic wave. The split disc has a diameter of one-fourth to one-half inch, and an ultrasonic signal of 2–4 megahertz is employed. Focusing of the transmitted and received ultrasonic waves is accomplished by a mechanical lens attached to the transmitting and receiving surfaces of the transducer elements. In order to vary the focus of the ultrasonic imaging system, different transducers with different focal length lenses must be employed.

FIG. 2 is a schematic diagram of a variably focused transducer array and circuitry for CW Doppler imaging in accordance with one embodiment of the invention. A CW signal source 20 provides a signal 22 which is applied through a plurality of conventional electronic time delay elements shown generally at 24 to a first portion of transducer elements 26 of the linear transducer array 18. The ultrasonic waves transmitted by the elements 26 are focused at a point 28 which is determined by the time delay of elements 24. CW reflected waves from point 28 are received by a second portion of transducer elements 30, and electrical signals generated thereby are transmitted through electronic time delay elements 32 to a Doppler demodulator 34. The demodulated signal is then employed to control a display 36.

FIG. 3 is a schematic diagram of another embodiment of the invention which employs baseband demodulation as taught in U.S. Pat. No. 4,155,258 and as employed in the General Electric Company PASS ultrasonic scanning system. In this embodiment, the electrical signals from the receiver transducer elements 30 are shifted to d.c. by the electronic mixers 40. The transducer signals are each mixed with the sine and cosine of a reference frequency, $f_o$, which are phase delayed by an increment for each channel, $\phi$. The reference frequency is equal to the transmitted ultrasonic frequency. The difference in frequency from each mixer 40 is obtained from a low pass filter 42 for each channel, then the sine and cosine difference frequencies are passed through time delay circuitry 44. The time delay sine and cosine components are summed at 46 and 48 and then applied to the Doppler demodulator 50 which produces the image control signal for display 52.

In a preferred embodiment the transmitter elements 26 lie on one side of the beam central axis, and the elements 30 which receive the reflected CW ultrasonic wave lie on the opposite side of the central beam axis. Advantageously, the central beam axis can be varied by 45° on either side of a perpendicular to the surfaces of the transducer elements as shown by the lines 34.

In one embodiment as employed in the General Electric PASS phased array ultrasound system, 32 elements are employed for transmission of the CW ultrasonic wave, and 32 elements are employed as the receiver of the reflected CW ultrasonic wave. At an operating frequency of 3.3 megahertz the linear array of elements is 16 millimeters in length. A focus of from 3 cm to 10 cm can be obtained with beam steering of ±45° from the perpendicular to the surfaces of the elements.

FIG. 4 is a schematic diagram of another embodiment of the invention which mixes the electrical signals from the receiver transducer elements 30 with a frequency signal at frequency, $f_1$, where $f_o > f_1$. Thus, an intermediate frequency, $f_i = f_o - f_1$, is obtained by passing the output signals from mixers 60 through bandpass filters 62 and then time delaying the I.F. signals by delay circuitry 64. The delayed I.F. signals are then applied to the Doppler demodulator 66 as in FIGS. 2 and 3.

Use of a linear array of transducer elements for CW Doppler imaging not only provides electronically variable focus in beam steering but also a larger aperture can be realized while retaining spatial and velocity resolution. While the invention has been described with reference to a specific embodiment, the description is illustrative of the invention and is not to be construed as limiting the invention. For example, the linear array of elements can be curved to further define a convergent wave or to define a divergent wave. Various modifications and applications may occur to those skilled in the art without departing from the true spirit and scope of the invention as defined by the appended claims.

What is claimed is:

1. A method of CW Doppler imaging comprising the steps of
    providing a linear array of transducer elements, and
    energizing a first plurality of transducer elements through time delay circuitry thereby transmitting a CW ultrasonic beam at a focal point determined by said time delay circuitry, said beam having a central axis, said first plurality of transducer elements being located on one side of said central axis of the transmitted CW ultrasonic beam, and
    receiving a reflected ultrasonic beam from said focal point with a second plurality of transducer elements, said second plurality of transducer elements being located on the opposite side of the central axis of the transmitted CW ultrasonic beam and not including any element of said first plurality of ultrasonic transducer elements.

2. The method as defined by claim 1 wherein focusing of said transmitted ultrasonic beam is variable between 3 cm and 10 cm and said central axis is variable by 45° from a perpendicular to said linear array.

3. A method as defined by claim 1 and further including the steps of
    generating electrical signals by said second plurality of transducer elements,
    time delaying the generated electrical signals,
    summing the time delayed signals, and
    demodulating the summed signals.

4. The method as defined by claim 3 wherein said step of generating electrical signals further includes the step of mixing each electrical signal generated by said second plurality of transducer elements with the sine and cosine of a reference signal to obtain sine and cosine difference frequency signals, said step of time delaying including time delaying said sine and cosine difference frequency signals, and summing the time delayed sine and cosine difference frequency signals.

5. The method as defined by claim 3 wherein said step of generating electrical signals further including the step of mixing each electrical signal generated by said second plurality of transducer elements with a reference signal to obtain intermediate frequency signals.

6. A CW Doppler imaging system comprising
    a source of a CW electrical signal,
    a linear array of transducer elements having a central axis,
    a first plurality of time delay means connected to said signal source and to a first plurality of transducer elements for applying said electrical signal to said first plurality of transducer elements, said first plurality of transducer elements being located on one side of said central axis of the transmitted CW ultrasonic beam,
    Doppler demodulator circuitry,
    a second plurality of time delay means connecting a second plurality of transducer elements to said Doppler demodular means, said second plurality of transducer elements being located on the opposite side of said central axis, and
    display means for displaying the demodulated Doppler signal.

7. The system as defined by claim 6 wherein beam focus and beam steering is defined by the time delay of said first plurality of time delay elements and said second plurality of time delay elements.

8. The system as defined by claim 6 and further including mixer means for mixing electrical signals generated by said second plurality of transducer elements with the sine and cosine of reference frequency signals, said second plurality of time delay means connected to receive the difference frequency signals from said mixer means.

9. The system as defined by claim 6 and further including mixer means for mixing electrical signals generated by said second plurality of transducer elements with a reference frequency signal to obtain intermediate frequency signals, said second plurality of time delay means connected to receive said intermediate frequency signals.

* * * * *